United States Patent Office.

EDMUND CHARLES ROSSITER, OF LANGLEY GREEN, AND HORACE WOODWARD CROWTHER, OF WEST BROMWICH, ENGLAND, ASSIGNORS TO BRITISH CYANIDES COMPANY, LIMITED, OF OLDBURY, ENGLAND.

PROCESS OF MAKING CYANIDS.

SPECIFICATION forming part of Letters Patent No. 688,794, dated December 10, 1901.

Application filed April 29, 1901. Serial No. 58,048. (No specimens.)

*To all whom it may concern:*

Be it known that we, EDMUND CHARLES ROSSITER, chemist, residing at Langley Green, near Birmingham, and HORACE WOODWARD CROWTHER, chemist, residing at the Beeches, West Bromwich, England, subjects of the King of Great Britain, have invented certain new and useful Cyanids of the Alkalies, of which the following is a specification.

We have found that when the sulfocyanids of the metals other than the alkalies or alkaline earths are heated to a suitable temperature in the presence of hydrogen the cyanogen is given off as hydrocyanic acid. This gas we absorb in caustic alkali. In order to prevent the contamination of the hydrocyanic acid with sulfureted hydrogen, a quantity of metal should be added, so that the total metal present is at least sufficient to combine with the sulfur of the sulfocyanid, to form a subsulfid or sulfid stable when heated in the presence of hydrogen. Where possible, it is better to use the same metal as that of the sulfocyanid used. In place of mixing the metal with the sulfocyanid the mixed gases resulting from the reaction may be passed through the metal; but this is not advantageous.

A sulfocyanid we find very suitable is cuprous sulfocyanid, and we proceed as follows: The dried cuprous sulfocyanid is introduced into a vessel in which the material can be agitated, either by the motion of the vessel itself or by internal agitators, and mixed with enough finely-divided copper to make the total copper present at least sufficient to combine with the sulfur of the sulfocyanid to form subsulfid of copper, ($Cu_2S$.) A current of hydrogen freed as far as this can conveniently be done from moisture is then passed through the vessel until the air is displaced. The vessel is heated first at a temperature below 150° centigrade, to drive off any moisture. The temperature is then raised to 200° and gradually to 350° centigrade and after most of the reaction has taken place to from 350° to 500° centigrade, the stream of hydrogen being passed through the whole of the time. The reaction which takes place may be represented by the following equation:

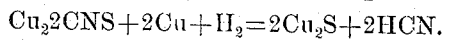
$$Cu_2 2CNS + 2Cu + H_2 = 2Cu_2S + 2HCN.$$

The gas which leaves the vessel, consisting of hydrocyanic-acid gas mixed with the excess of hydrogen, is drawn through vessels containing a solution of caustic alkali, (potash or soda,) whereby the hydrocyanic acid is absorbed, and the excess of hydrogen may be passed on to a suitable storage. Owing to the nature of poisonous hydrocyanic-acid gas it is advisable to carry on the operation under diminished pressure. The mixed gases are passed through until the caustic is converted into a cyanid of the alkali. This solution is then boiled down in vacuum-pans to obtain a solid cyanid. After the copper sulfocyanid has been decomposed the residue in the vessel, consisting for the most part of sulfid of copper, may be decomposed into oxid of copper by heating in a stream of air. Part of the copper oxid is then used for making the copper salt for the production of more sulfocyanid, while the other is completely reduced to metallic copper by the action of hydrogen or of gases containing hydrogen or of other reducing gases for the purpose of mixing with further sulfocyanid of copper.

The process when dealing with other sulfocyanids is similar.

Besides the use of hydrogen prepared by well-known methods the hydrogen may be in the form of a gas containing hydrogen—such as coal-gas or producer or water gas—providing such gases are freed from oxygen, carbonic acid, and moisture before use.

What we claim is—

1. The manufacture of the cyanids of the alkalies by heating a sulfocyanid of a metal other than the alkalies or alkaline earths in the presence of hydrogen and absorbing the hydrocyanic-acid gas so produced in caustic alkali.

2. The manufacture of the cyanids of the alkalies by heating a sulfocyanid of a metal other than the alkalies or alkaline earths in the presence of hydrogen, eliminating the sulfur by means of finely-divided metal and absorbing the hydrocyanic-acid gas so produced in caustic alkali.

3. The manufacture of the cyanids of the alkalies by mixing a sulfocyanid of a metal other than the alkalies or alkaline earths with a quantity of metal such that the total metal present is at least sufficient to combine with the sulfur of the sulfocyanid to form a stable sulfid when heated in the presence of hydrogen, heating the mixture in the presence of hydrogen and absorbing the hydrocyanic-acid gas so produced in caustic alkali.

4. The manufacture of the cyanids of the alkalies by mixing cuprous sulfocyanid with a quantity of copper such that the total copper present is at least sufficient to combine with the sulfur of the sulfocyanid to form subsulfid of copper heating the mixture in the presence of hydrogen and absorbing the hydrocyanic-acid gas so produced in caustic alkali.

5. The manufacture of the cyanids of the alkalies by heating to a temperature of from 200° centigrade to 500° centigrade a sulfocyanid of a metal other than the alkalies or alkaline earths in the presence of hydrogen and absorbing the hydrocyanic-acid gas so produced in caustic alkali.

6. The manufacture of the cyanids of the alkalies by heating to a temperature of from 200° centigrade to 500° centigrade a sulfocyanid of a metal other than the alkalies or alkaline earths in the presence of hydrogen, eliminating the sulfur by means of finely-divided metal and absorbing the hydrocyanic-acid gas so produced in caustic alkali.

7. The manufacture of the cyanids of the alkalies by mixing a sulfocyanid of a metal other than the alkalies or alkaline earths with a quantity of metal such that the total metal present is at least sufficient to combine with the sulfur of the sulfocyanid to form a stable sulfid when heated in the presence of hydrogen heating to a temperature of from 200° centigrade to 500° centigrade the mixture in the presence of hydrogen and absorbing the hydrocyanic-acid gas so produced in caustic alkali.

8. The manufacture of the cyanids of the alkalies by mixing cuprous sulfocyanid with a quantity of copper such that the total copper present is at least sufficient to combine with the sulfur of the sulfocyanid to form subsulfid of copper heating to a temperature of from 200° centigrade to 500° centigrade the mixture in the presence of hydrogen and absorbing the hydrocyanic-acid gas so produced in caustic alkali.

EDMUND CHARLES ROSSITER.
HORACE WOODWARD CROWTHER.

Witnesses:
JAMES RICHARDSON HOLLIDAY,
WALTER COOPER.